United States Patent [19]

Clark

[11] Patent Number: 4,473,066
[45] Date of Patent: Sep. 25, 1984

[54] HEAT TRANSFER PANEL AND METHOD

[76] Inventor: Peter C. Clark, 1674 Pleasant Hill Rd., Pleasant Hill, Calif. 94523

[21] Appl. No.: 257,179

[22] Filed: Apr. 24, 1981

[30] Foreign Application Priority Data

Apr. 30, 1980 [JP] Japan .................. 55-57716

[51] Int. Cl.³ .............................................. F24J 3/02
[52] U.S. Cl. .................. 126/449; 126/444; 165/170
[58] Field of Search .............. 126/449, 450, 444, 447, 126/901; 165/170

[56] References Cited

U.S. PATENT DOCUMENTS

| | | |
|---|---|---|
| 3,076,450 | 2/1963 | Gough et al. |
| 3,077,190 | 2/1963 | Allen .................. 126/271 |
| 3,146,774 | 9/1964 | Yellott .................. 126/271 |
| 3,215,134 | 11/1965 | Thomason .................. 126/449 |
| 3,620,206 | 11/1971 | Harris .................. 126/271 |
| 3,918,430 | 11/1975 | Stout et al. .................. 126/449 |
| 3,943,911 | 3/1976 | Yu .................. 126/271 |
| 3,965,887 | 6/1976 | Gramer et al. .................. 126/271 |
| 3,968,786 | 7/1976 | Spielberg .................. 126/901 X |
| 3,981,293 | 9/1976 | Gillery .................. 126/901 |
| 3,989,031 | 11/1976 | Thomason et al. .................. 126/271 |
| 3,991,742 | 11/1976 | Gerber .................. 126/271 |
| 4,010,733 | 3/1977 | Moore .................. 126/271 |
| 4,037,014 | 7/1977 | Gittleman .................. 126/901 |
| 4,048,980 | 9/1977 | Googin et al. .................. 126/901 |
| 4,082,082 | 4/1978 | Harvey .................. 126/449 |
| 4,085,731 | 4/1978 | Weir .................. 126/448 |
| 4,095,428 | 6/1978 | Warren .................. 126/449 X |
| 4,096,850 | 6/1978 | Hadcroft .................. 126/271 |
| 4,114,597 | 9/1978 | Erb .................. 126/449 |
| 4,116,222 | 9/1978 | Seifried .................. 126/900 X |
| 4,125,108 | 11/1978 | Porter et al. .................. 126/448 |
| 4,145,462 | 3/1979 | Kuwabara et al. .................. 126/901 |
| 4,182,308 | 1/1980 | Reynolds .................. 126/437 |
| 4,191,169 | 3/1980 | Hyman .................. 126/444 |
| 4,192,287 | 3/1980 | James .................. 126/449 |
| 4,201,194 | 5/1980 | Charles .................. 126/449 |
| 4,201,195 | 5/1980 | Sakhuja .................. 126/449 |
| 4,205,658 | 6/1980 | Clark .................. 126/444 |
| 4,206,748 | 6/1980 | Goodman et al. .................. 126/444 |
| 4,213,450 | 7/1980 | Perez .................. 126/448 |
| 4,219,012 | 8/1980 | Bergen .................. 126/449 |
| 4,224,928 | 9/1980 | Werner et al. .................. 126/450 |
| 4,237,870 | 12/1980 | Wartes .................. 126/450 |
| 4,244,353 | 1/1981 | Straza .................. 126/448 |
| 4,286,583 | 9/1981 | Dunn et al. .................. 126/448 |
| 4,290,414 | 9/1981 | Sharp .................. 126/448 |

FOREIGN PATENT DOCUMENTS

| | | | |
|---|---|---|---|
| 2536687 | 3/1977 | Fed. Rep. of Germany | 126/449 |
| 2656490 | 2/1978 | Fed. Rep. of Germany | 126/901 |
| 7523920 | 7/1975 | France | 126/448 |
| 2319858 | 2/1977 | France | |
| 325928 | 3/1930 | United Kingdom | |

OTHER PUBLICATIONS

"Optic Materials for Solar-Energy Applications", Optic News, Summer 1976.
Fafco is Solar Heating.

*Primary Examiner*—Samuel Scott
*Assistant Examiner*—Noah Kamen
*Attorney, Agent, or Firm*—Manfred M. Warren; Robert B. Chickering; Glen R. Grunewald

[57] ABSTRACT

A durable, low-cost, heat transfer panel of the type typically employed as a solar energy collector is disclosed. The panel includes a flow channel defining structure, preferably formed as a corrugated sheet and a superimposed flexible membrane, to which manifolds or headers are secured. The manifolds have mating corrugated surfaces that are interengaged with the corrugations on the panel sheet to provide transverse rigidity to the overall panel structure as well as distribution of heat transfer fluid to and from the panel. Modified forms of the panel are disclosed in which the panel includes a selective absorber and a venting structure. A method for blow-molding the manifold into mating interengagement with the corrugated support sheet of the panel is also disclosed.

9 Claims, 16 Drawing Figures

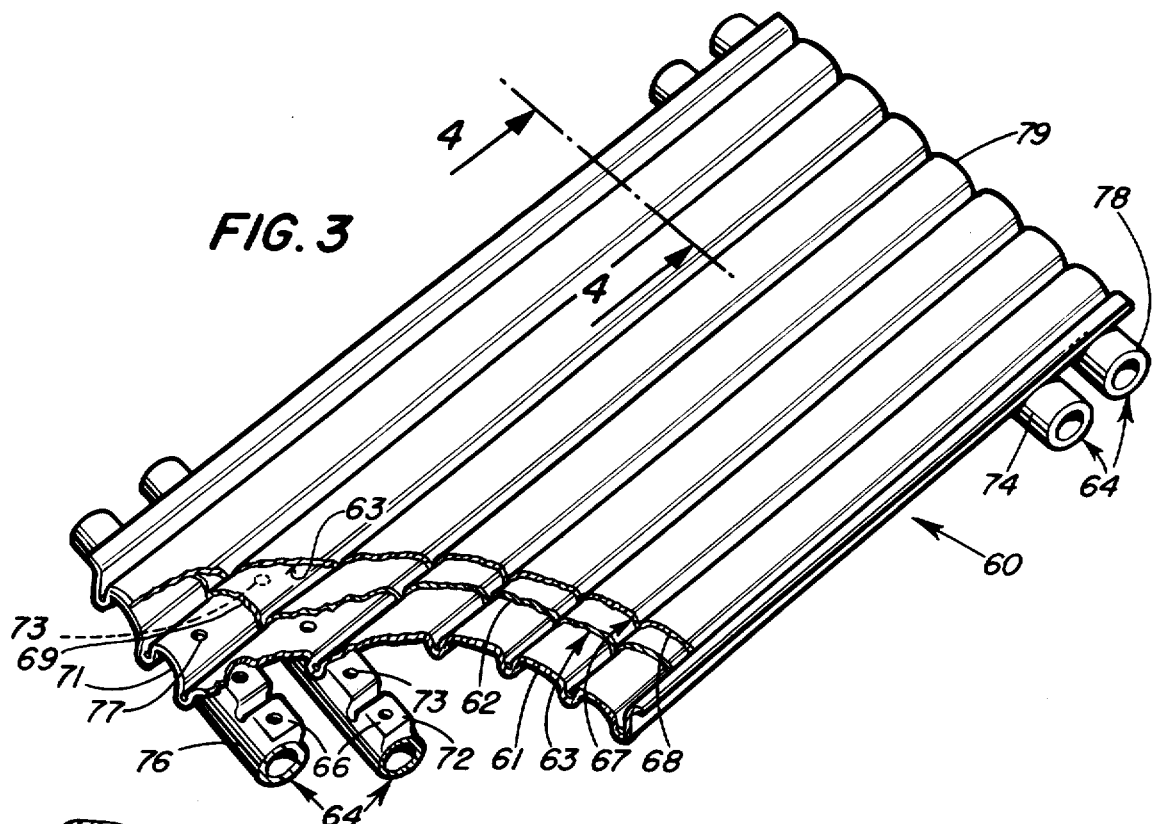
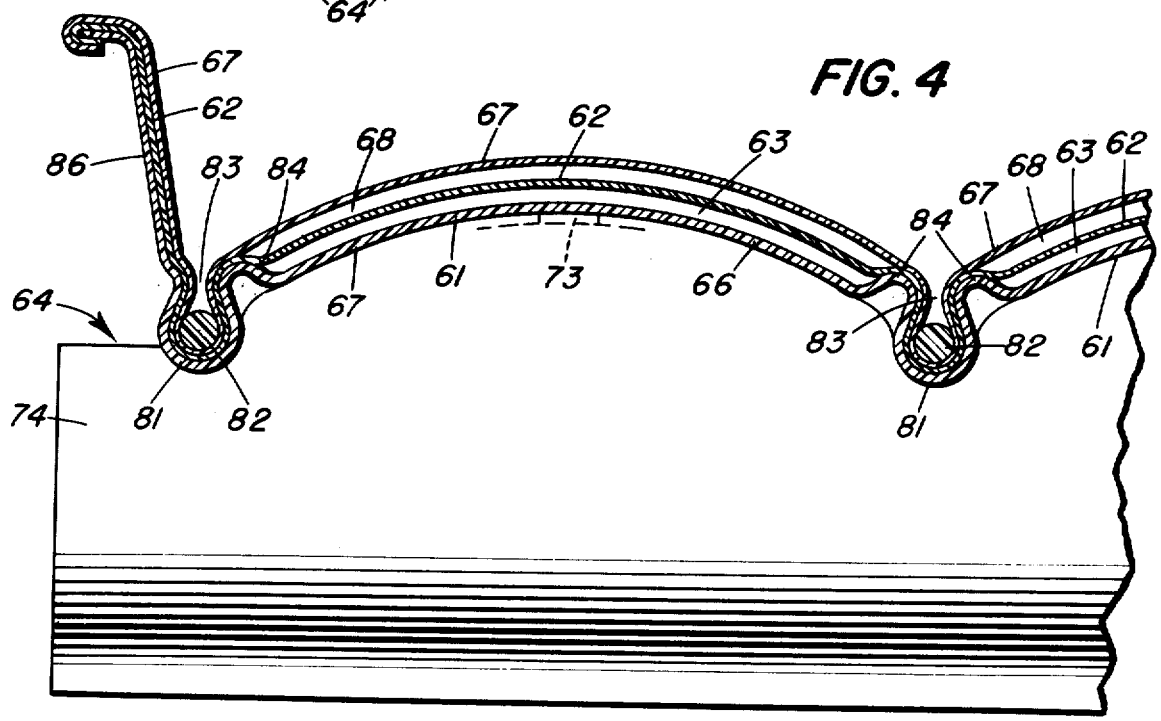

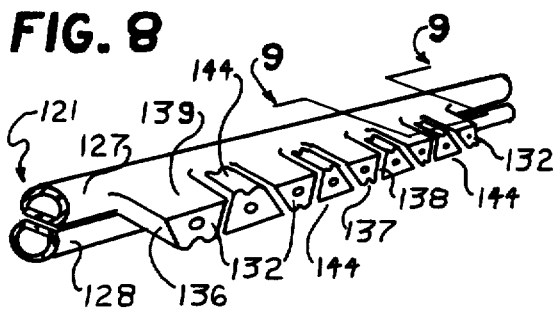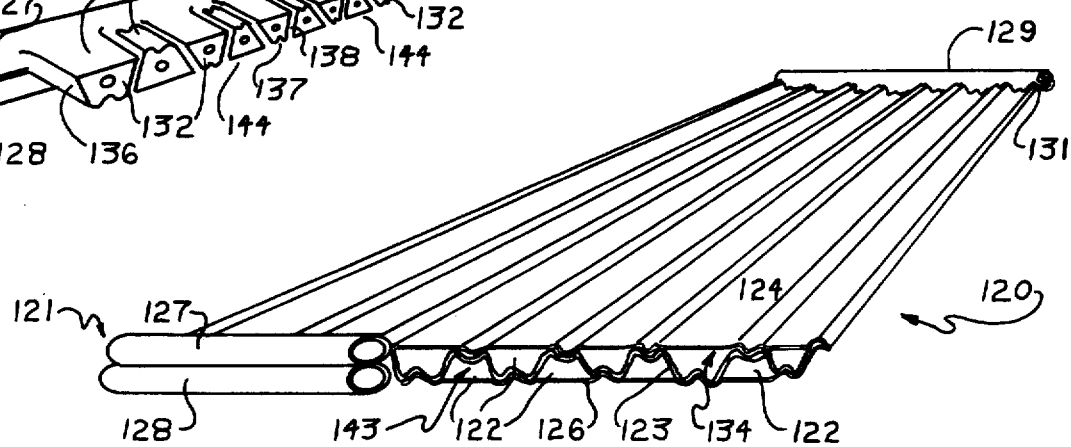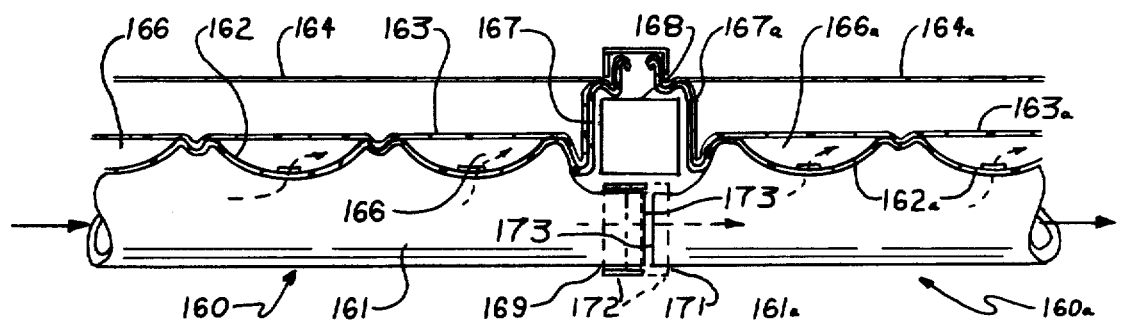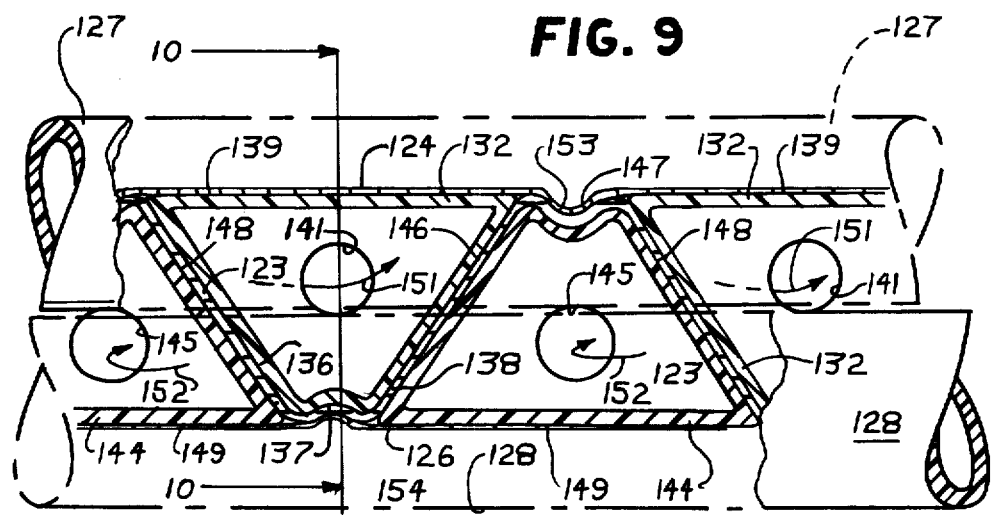

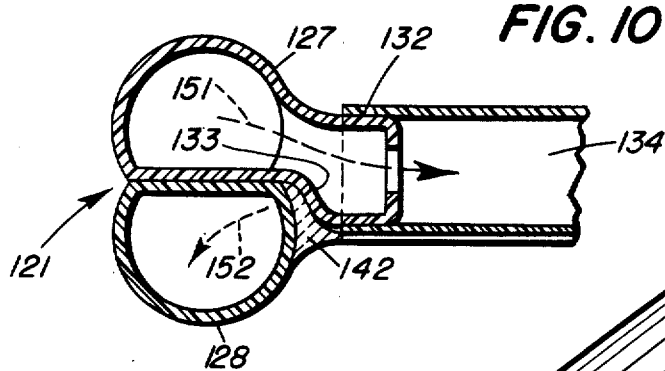
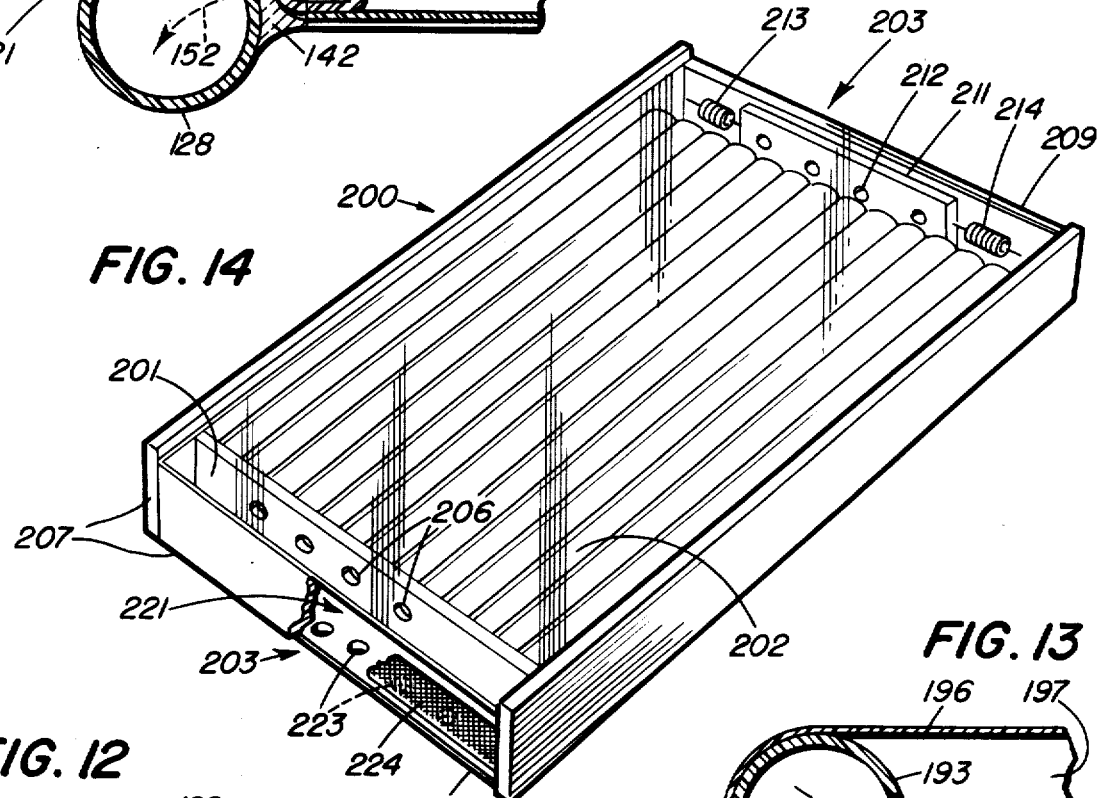
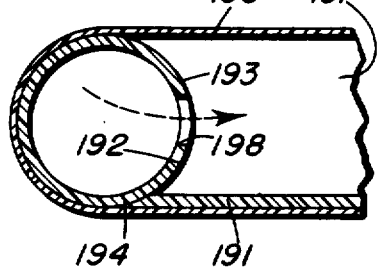
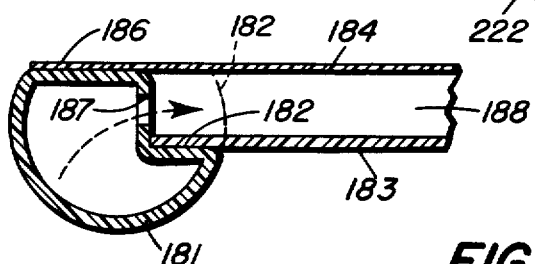
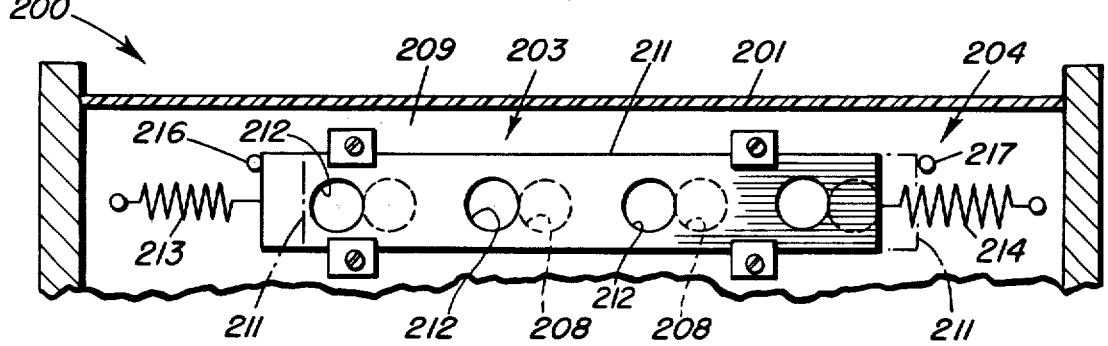

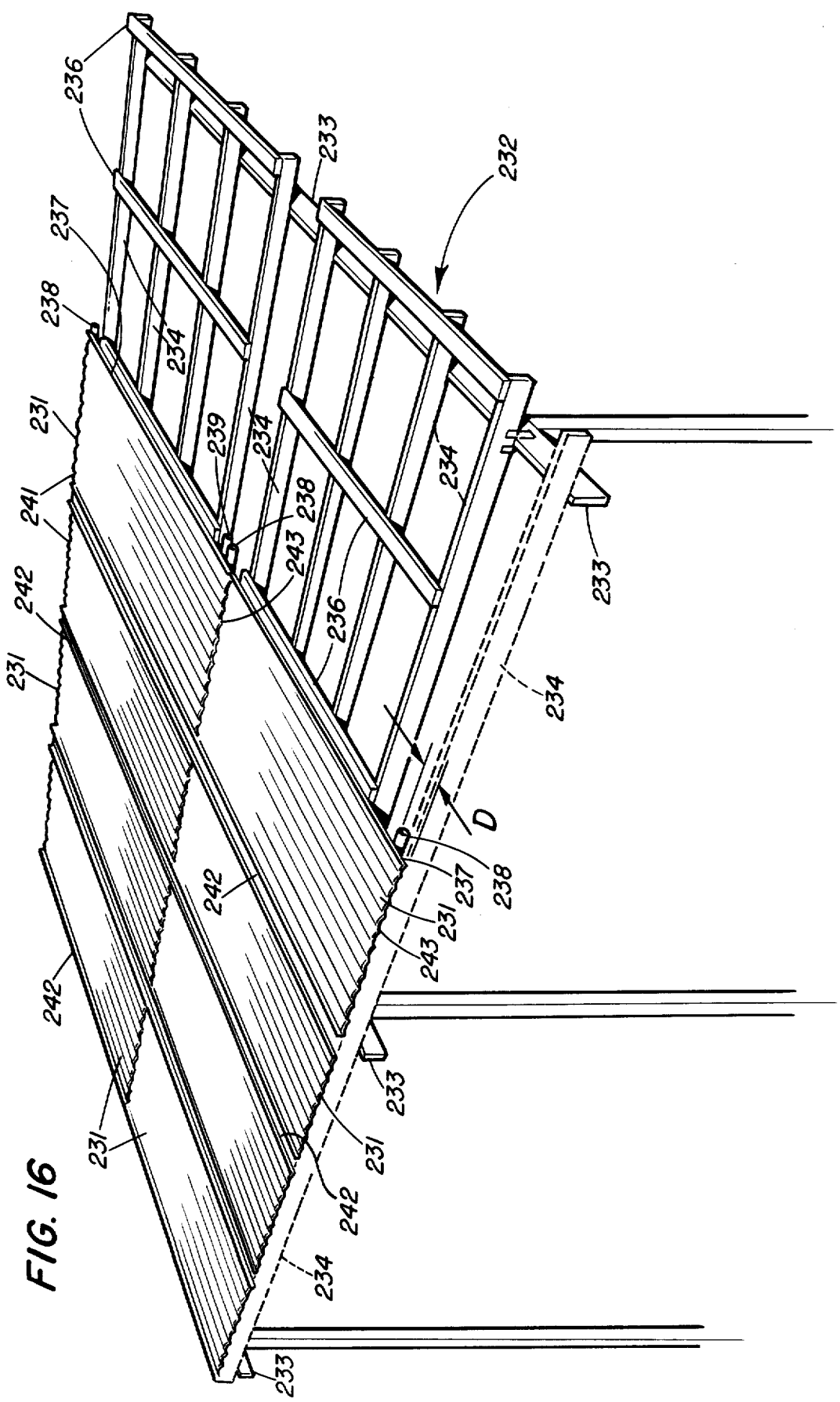

HEAT TRANSFER PANEL AND METHOD

BACKGROUND OF THE INVENTION

The cost of fabrication remains a major consideration in connection with heat transfer panels and particularly solar energy collectors. Generally, as the efficiency of heat transfer increases, so does the cost of the panel.

In my U.S. Pat. No. 4,205,658, a heat transfer panel is set forth in which a flexible membrane is distended over a corrugated support surface and means, such as cylindrical transparent tubing, are used to distort the membrane down into the recesses in the corrugated support surface for flow of the heat transfer fluid, not only in the recessed areas, but very importantly, over the protruding areas of the corrugations. The resultant heat transfer channels are relatively thin in cross-section, and the heat transfer efficiency is relatively good, particularly when considering the low-cost construction of the panel.

Although representing a significant reduction in cost over prior panels of equal efficiency, the heat transfer panel of my U.S. Pat. No. 4,205,658 could also benefit from further reductions in cost. Thus, the manner in which the flexible membrane or envelope is retained against the corrugated support surface could be simplified with attendant cost savings.

Most unglazed solar collectors or heat transfer panels that are relatively low in cost are not self-supporting. Thus, structures such as are shown in U.S. Pat. No. 3,991,742 must be roof-mounted or placed in a special framework or support structure providing support under virtually the entire surface area of the panel. The solar collector which has been most successfully commercially developed is a relatively low-cost collector by Fafco Solar of Menlo Park, Calif. The Fafco collector, however, is formed by a plurality of side-by-side polyolefin tubing that is quite flexible, particularly when exposed to the sun. Accordingly, the Fafco collector requires a complete support surface for its installation and use.

Another aspect of prior heat transfer panels or solar collectors which has been largely disregarded is the construction of inlet and collection manifolds. Most solar panels are understandably concerned with considerations other than the distribution and collection of heat transfer fluid from the panel. Accordingly, the most common approach is just simply to employ a transverse pipe with a plurality of openings along the length thereof as the inlet manifold and a similar pipe or chamber at the opposite end of the panel as a collector. Such pipes are usually inserted into and sealed in a bag or envelope or they are built into the end of a box or containment structure for the panel. The manifolds are seldom truly integrated with the panel construction in a way which would affect panel strength or the cost of production.

Solar energy collector panels are widely marketed for home use with little or no consideration being given to the problem of safety of the user, particularly with regard to the possibility of scalding as a result of stagnation of water in the panel. The problem of scalding can occur most readily in connection with solar collectors which have glazing above the heat transfer flow channels. The glazing provides a dead air space which will permit and result in much higher temperature operation of the panel. Thus, when the solar irradiation is high, the panel flow rate may be too slow with the result that water temperature in the panel is undesirably high and can even scald the user of a home water system. An inexpensive and reliable means for dissipating heat from a glazed heat transfer panel or solar collector would be highly advantageous.

OBJECTS OF THE INVENTION

It is the object of the present invention to provide a heat transfer panel which is high in efficiency and yet low in cost of production.

Another object of the present invention is to provide a heat transfer panel in which the number of component parts is minimized.

Another object of the present invention is to provide a heat transfer panel in which the durability is increased and maintenance and repair requirements reduced.

A further object of the present invention is to provide a heat transfer panel having greater structural rigidity and which is capable of being self-supporting for use as a building panel.

Still a further object of the present invention is to provide a heat transfer panel which can be used as a counterflow heat exchanger.

Still another object of the present invention is to provide a heat transfer panel which is formed with glazing for high temperature operation and yet is safe and will not expose users to scalding.

Still a further object of the present invention is to provide a method for forming a heat transfer panel which is relatively simple and inexpensive to perform and produces a panel of high structural strength and superior efficiency.

Another object of the present invention is to provide a heat transfer panel which can be employed both as a collector and a radiator.

Still a further object of the present invention is to provide a heat transfer panel which acts as a selective surface or absorber of radiant energy and yet re-radiates only a small portion of such energy.

The heat transfer panel and method of the present invention have other objects and features of advantage which will become apparent from the accompanying drawing and the following description of the preferred embodiments.

SUMMARY OF THE INVENTION

The durable, low-cost, heat transfer panel of the present invention includes flow channel defining means formed with longitudinally extending corrugations defining at least in part a plurality of side-by-side longitudinally extending flow channels, and manifold means secured to the flow channel defining means and formed to distribute and collect a heat transfer fluid from the flow channels. In one aspect, the improvement in the heat transfer panel of the present invention is comprised, briefly, of the manifold means being formed to conform to and mate with and is secured in interengagement with the corrugations in the flow channel defining means to provide transverse rigidity to the panel. In another aspect the manifold means acts as an end closure for the flow channels. The panel of the present invention further includes improved retention means when the flow channel defining means include a flexible membrane. Retention means in the form of bonding of the membrane to a support surface and mechanically coupling the membrane to the support surface are provided. In an additional aspect a glazed panel of the present invention is provided with spring biased automatic venting to preheat overheating and stagnation of heat transfer fluid in the panel. Finally, the panel includes a selective absorber element, usually a membrane having an absorber material dispersed in the basic membrane material.

The method of the present invention is comprised, briefly, of molding the manifold means to the panel corrugations to produce a high strength, low-cost panel.

DESCRIPTION OF THE DRAWING

FIG. 3 is a top prospective view of an alternative embodiment of the heat transfer panel of the present invention.

FIG. 4 is an enlarged, fragmentary, cross-sectional view taken substantially along the plane of line 4—4 in FIG. 3.

FIG. 7 is a top prospective view of a further alternative embodiment of the heat transfer panel of the present invention.

FIG. 8 is a top prospective view of the manifold portion of the panel of FIG. 7.

FIG. 9 is an enlarged, cross-sectional view, taken substantially along the plane of line 9-9 in FIG. 8.

FIG. 10 is a reduced, fragmentary, cross-sectional taken substantially along the plane of line 10—10 in FIG. 9.

FIG. 11 is an end elevational view of two panels connected together in side-by-side relationship and constructed in accordance with the further alternative embodiment of the present invention.

FIG. 12 is a fragmentary, end cross-sectional view of an alternative embodiment of a panel and manifold constructed in accordance with the present invention.

FIG. 13 is a fragmentary, end cross-sectional view of a panel and manifold constructed in accordance with the further alternative embodiment of the present invention.

FIG. 14 is a top prospective view of a glazed panel constructed in accordance with the present invention.

FIG. 15 is a fragmentary, enlarged, cross-sectional view of one end of the panel of FIG. 14.

FIG. 16 is a top prospective view of a plurality of heat transfer panels used as a roof structure.

DESCRIPTION OF THE PREFERRED EMBODIMENT

Figure 1:
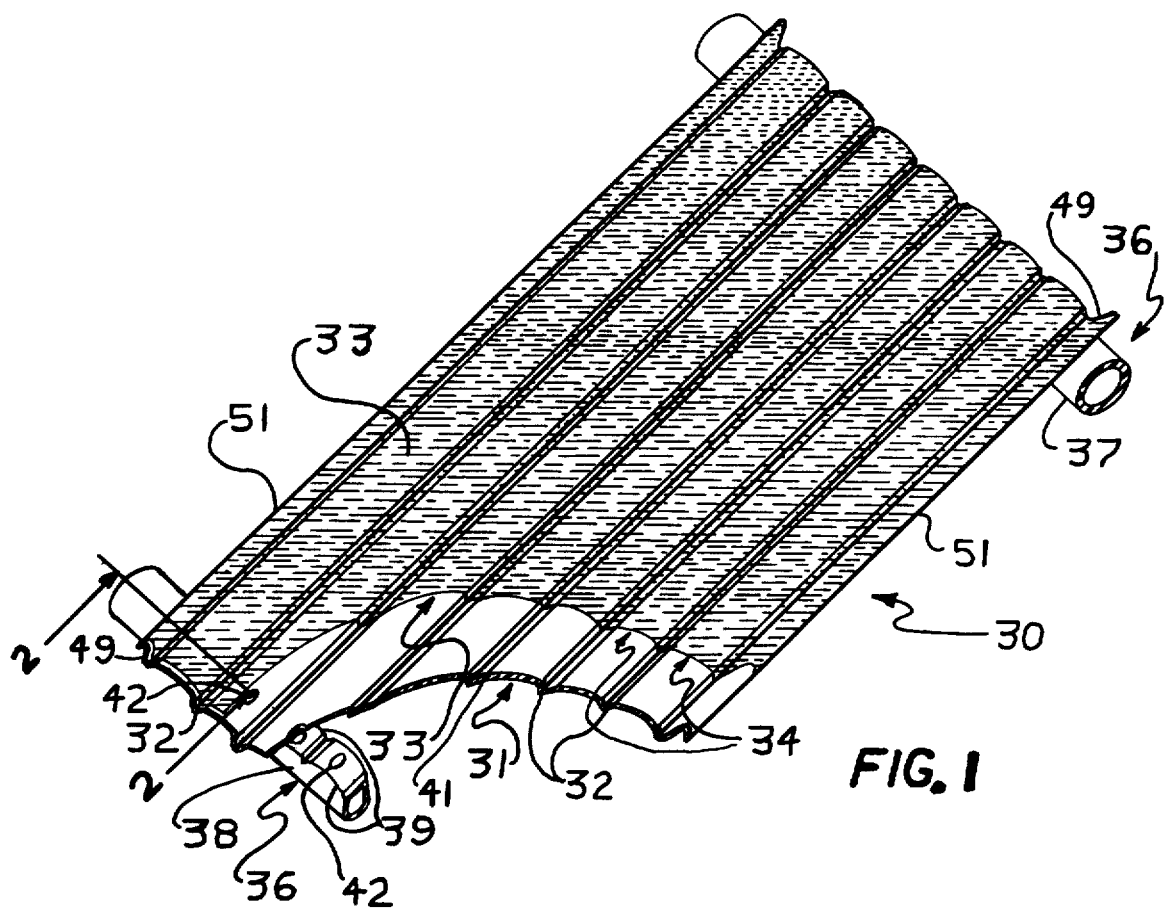
FIG. 1 is a top prospective view of a heat transfer panel constructed in accordance with the present invention and partially broken away.
Figure 2:
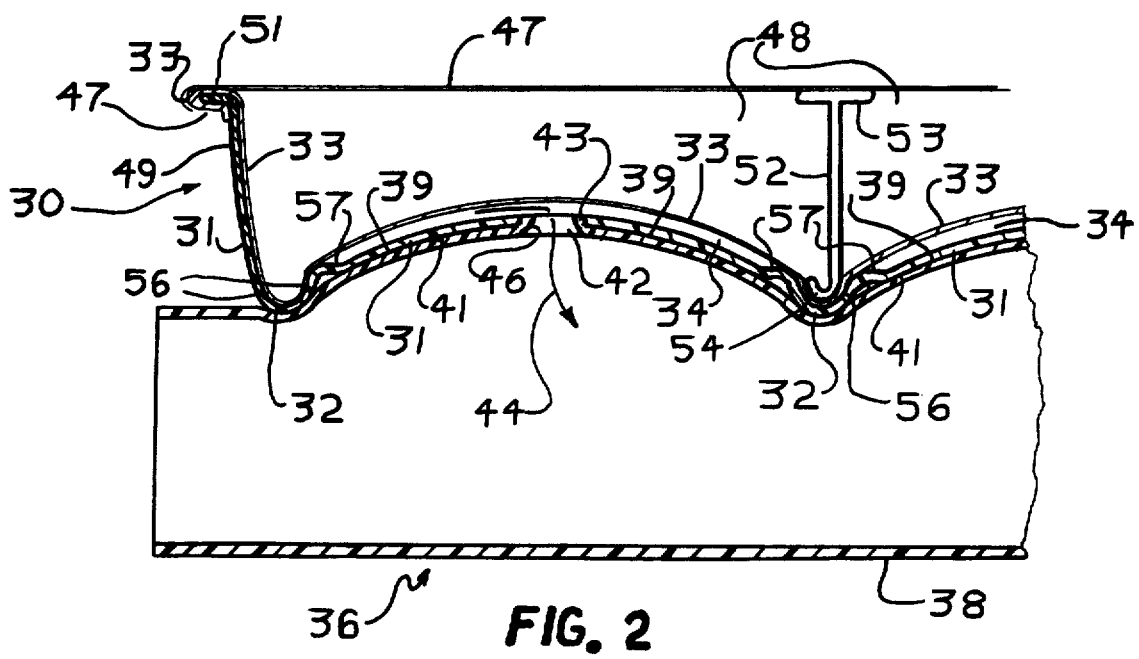
FIG. 2 is an enlarged cross-sectional view taken substantially along the plane of line 2—2 in FIG. 1 and showing the panel of FIG. 1 with added glazing.

Referring now to FIGS. 1 and 2, the durable, low-cost, heat transfer panel of the present invention can be seen to include a sheet-like flow channel defining means formed with longitudinally extending corrugations defining, at least in part, a plurality of side-by-side, longitudinally extending, flow channels 34. The panel further includes manifold means, generally designated 36, secured to the flow channel defining means proximate an end thereof. In the form of the invention shown in FIG. 1, manifold means 36 is comprised of a tubular inlet manifold 38 at the lower end of the panel and a second tubular collection manifold 37 at the upper end of the panel, each formed for flow of the heat transfer fluid, such as air or water, between the manifold means and the flow channels. Although flow can be reversed, it is generally preferable to introduce the heat transfer fluid into the panel from the bottom end so that the air trapped in the panel will be minimized. The flow, therefore, is from inlet manifold 38 into the flow channels 34, up through channels 34 and into collection manifold member 37 of manifold means 36.

In the preferred form of the invention the flow channel defining means is provided by a first sheet-like member 31, which may be a relatively rigid corrugated sheet formed out of a material such as a corrosion and heat resistant plastic reinforced by fiberglass (also known as FRP-Fiberglass Reinforced Plastic). First member 31 may also be advantageously formed of material such as galvonized steel, aluminum or other plastics. The formation of first sheet-like member 31 as a longitudinally corrugated sheet produces a sheet which is relatively strong and resistant to bending about an axis transverse to the corrugations, although the sheet is susceptible to bending about an axis parallel to the corrugations.

The flow channel means also preferably include a sheet-like second member 33, which can be formed of the same type of material as first sheet member 31. It is preferable, however, to form sheet 32 as a flexible thin membrane which is secured in a distended condition over support sheet 31 to define relatively thin flow channels 34 extending over substantially the entire surface of the transfer panel. The preferred material for formation of second member or membrane 33 is polyester terephthalate (PET) film, although other films such as polymethyl methacrylate may also be used.

Although it is preferable to form the flow channel means of the heat transfer panel from two sheets 31 and 32 which are secured together, it will be understood that such a flow channel medium or means could also be formed by extruding or molding, with sheet 32 being integrally formed with sheet 31. Whether formed from two sheets secured together or an integrally molded member, the corrugated flow channel means affords a high strength to volume ratio for the panel, with attendant cost savings.

As thus far described, the heat transfer panel of the present invention contains elements found in the panel of my prior U.S. Pat. No. 4,205,658.

In the improved heat transfer panel of the present invention, one aspect of the improvement in the panel is comprised of manifold means 36 being provided with a transversely extending surface means 39 formed to substantially conform to and mate with at least one side of the corrugated flow channel means, namely, an outwardly facing side of first member 31 and particularly to conform to the corrugation in the first member. The mating engagement of the upper surface 39 of manifold member 38 with the underneath surface or outwardly facing side 41 of sheet-like member 31 can best be seen in FIG. 2.

The formation of manifold means 36 to conform to the underneath surface of the corrugated support sheet 31 provides the overall panel with a very high degree of transverse rigidity, particularly when manifold means 36 is formed as a pair of manifolds each conforming to the underneath side of the panel and positioned at opposite ends of the panel, as is shown in FIG. 1. Thus, the resultant heat transfer panel has a high degree of longitudinal rigidity as a result of the corrugations and a high degree of transverse rigidity as a result of manifold 37 and 38. Heat transfer panels constructed in this fashion are self-supporting and can actually be used as structural or building panels with a minimum of framing, as may be seen in FIG. 16 and will be described more fully hereinafter.

In order to distribute a heat transfer fluid to and from flow channels 34, manifold members 37 and 38 are provided with openings 42 which pass through a mating opening 43 in the support sheet 31 so as to permit fluid to flow into the flow channels, as indicated by arrow 44 in FIG. 2, or out of the flow channels. Additionally, it is preferred that opening 42 in the manifold be defined by a tubular protrusion 46 which extends up through opening 43 in support sheet 31. The annular protrusion or dimple 46 preferably has a height extending through opening 43 beyond the first sheet member so that the edge of opening 43 is not exposed to the heat transfer fluid. When the support sheet is formed of a fiber-reinforced plastic, prolonged exposure of the edges of the support sheet to fluids, such as water, can cause migration of the water along the fibers of the support sheet, causing degradation and deterioration of the sheet. Accordingly, the annuluar protrusion 46 can be bonded to the inside of opening 43 so that no edges of sheet 31 are exposed to the heat transfer fluid. The surfaces, as opposed to the edges, of the fiber-reinforced support sheet are impervious to conventional heat transfer fluids. It is only when exposed fiber is encountered at the edges of the sheet that problems can occur.

Although manifold means 36 is preferably tubular, making it well suited for blow-molding as is described hereinafter, it is also possible to form manifolds 37 and 38 as trough-shaped members having U-shaped cross-sections and formed with corrugated side lips which provide a substantial area mating with the corrugated support sheet. Such corrugated lip portions afford bonding surfaces for the manifold and interengage with the panel support surface to provide transverse rigidity.

As will be seen from FIGS. 1 and 2, the form of manifold means 36 is somewhat complex in nature. The manifold means is preferably tubular and has substantial surface areas 39 which must mate with the underneath side of the corrugated panel. It is a further important feature of the present invention to provide a method for formation of a heat transfer panel in which the lightweight corrugated sheets are transversely rigidified by lightweight low-cost manifold members positioned at each end of the panel.

As is true for other panel-forming methods, the method of the present invention includes the steps of mounting sheet-like member 33 in superimposed relation to corrugated sheet-like member 31 to form a plurality of side-by-side flow channels 34 therebetween. Additionally, the present method includes the step of securing manifold means 36 to the panel for the communication of a heat transfer fluid to and from flow channels 34. In the improved method, however, the step of molding the manifold means to conform to the corrugations in the corrugated sheet-like member is accomplished prior to completion of the securing step in which the manifold is secured to the panel. More particularly, it is preferred that tubular manifolds 37 and 38 be blow-molded either against a corrugated mold or, advantageously, directly against the corrugated sheet itself. Blow-molding of manifold means 36 directly against the corrugated sheet to which it is to be secured has severaly advantages.

First, using the sheet as a molding pattern ensures that any variations from sheet-to-sheet will be correspondingly accommodated during the blow-molding of the manifold to the particular sheet. Secondly, and very importantly, it is desirable to bond as much of upwardly facing surface means 39 to the underside of the sheet as possible in order to enhance the overall rigidity of the panel. It is possible, therefore, to place a thermoforming or thermo-setting bonding agent between the tubular manifold and corrugated sheet prior to blow-molding. The elevated temperatures occurring during the blow-molding of the manifold against the support sheet will cause thermo-bonding of the tubular manifolds to the support sheet. It is also possible to heat seal the manifold means, which is preferably formed of a plastic material, to support sheet 31, if, for example, the manifold is formed from a suitable plastic material, such as an ABS plastic (preferred) or polymethyl methacrylate.

In order to reduce and resist any tendancy of manifold means 36 to pull away from the sheet-like flow channel defining means, it is preferable to form the panel with strap means 45 secured to edge flange 49 and extending down and around the manifold members. Separation of the manifold members from the remainder of the panel is most likely to occur proximate the ends of the manifolds. Accordingly, a strap 45 may be provided at each end of the manifold members.

With respect to formation of the manifold with a dimple or protrusion 46, this can be accomplished by forming openings 43 in support sheet 31 prior to the blow-molding step so that blow-molding will cause a dimple or protrusion to form up into opening 43. After the blow-molding step, the dimple can be drilled or punched out to form opening 42, with the result that there will be an annular protrusion 46 in abutting contact with the edge of opening 43 in support sheet 41.

The size of the aligned openings 42 and 43 may be selected so as to meter the flow of heat transfer fluid between the manifold and flow channels in accordance with the fluids being metered, the pressure desired in the flow channels and the overall panel design. Although not shown in FIG. 1, it is possible to provide a glazing sheet 47 (FIG. 2) which extends over panel 30 and defines a dead air space 48 above membrane 33. In the preferred form the glazing sheet 47 may be provided as a thin film or membrane similar to membrane 33, although the glazing sheet must be formed of a transparent material while membrane 33 can be opqque, as will be more fully described hereinafter Both membrane 33 and glazing sheet 47 may be bonded to and secured around the upstanding, longitudinally extending, side edge flange 49 and lip 51 of support sheet 31, as may be seen in FIG. 2.

A further important feature of the present invention is to employ a fiber reinforced plastic sheet as a support member which sheet has a polyester film bonded to both sides of the sheet, particularly at the sheet edges. In FIG. 2, for example, polyester film 33 is bonded in recesses 32 in sheet 31 and extends up side 49 to lip 51. Moreover and very importantly, film 33 extends around the lip or edge 51 and is bonded to the opposite side thereof.

It has been found that FRP sheets are somewhat shatter-prone and suseptible to tears and the probagation of mechanical cracks in the sheet, particularly from the edges of the sheet. While MYLAR has previously been bonded to one side of a FRP sheet to increase abrasion resistance, the bonding of a polyester film around the edges to substantially increase tear resistance and crack probagation resistance is an advance which greatly increases the durability of the panel of the present invention.

Such a polyester film-FRP-polyester film sandwich can be formed by using conventional FRP panel forming techniques. Usually a mass of uncured thermo-setting polyester resin with reinforcing fibers is placed upon a cellophane lower sheet. A second cellophane sheet is placed over the resin and fibers, and the two sheets are drawn through extrusion dies, usually wooden until the desired sheet cross-section is achieved. The extruding or pull-trusion process takes place at an elevated temperature, and after leaving the dies the cellophane sheets are stripped from the pulltruded sheet of FRP.

To form a crack and shatter resistant sheet, polyester films such as polyethylene terephthalate, can be substituted for the cellophane. During the pull-trusion process the temperature can be maintained just below the crystalization temperature of the films with the result that the films are bonded to the FRP up to and around the edges of the sheet. This bonding produces a sandwich which is tear and shatter resistant.

When support sheet 31 is formed without bonding of a film to both sides thereof, it is also possible to obtain many of the advantages of tear and crack resistance by adhesively bonding film 33 up side flange 49 and around the edge of lip 51 of the support sheet.

Referring again to FIG. 2, although sheet 47 may have a thickness and a strength to enable it to be self-supporting between the upstanding edge flanges 49 of the panel, it is further preferable to provide the panel of the present invention with spacer means 52 formed at 53 for support of glazing sheet 47 and formed at 54 for mounting to the support sheet 31, preferably at recesses 32. As shown in FIG. 2, spacer 52 has a generally J-shaped configuration and may be bonded by an adhesive or the like to both support sheet 47 and sheet 33 bonded in recess 32. Alternatively, spacer means 52 can simply be formed to rest on the shoulders defining recess 32 and sheet 47 in turn be supported, but not bonded to the upper end of the spacer. Spacer 52 need not extend over the full length of the corrugations but can be periodically placed therealong, depending upon the strength of sheet 47 and its capability for being self-supporting. Spacer means 52 can also have a body which is transparent or formed with openings so as to have a minimum blocking effect with respect to radiation on flow channels 34.

In another aspect of the heat transfer panel of the present invention, improved means for retaining the sheet-like member 33 in a distended closely superimposed relationship over the support member is provided. In my prior U.S. Pat. No. 4,205,658, a heat transfer panel was disclosed in which a flexible membrane was distended over a corrugated sheet and retained in close proximity thereto to define flow channels by retention means which preferably had the form of a plurality of cylindrical transparent tubular members. The weight of the tubes on the film forced the flexible membrane down into the recessed areas of the corrugated sheet so that the heat transfer fluid would flow, not only in the recessed areas, but also over the longitudinally extending relatively elevated areas of the sheet. In the improved heat transfer panel of the present invention the retention means by which sheet 33 is retained in close proximity to support sheet 31 is provided by bonding the sheet-like member 33 to support surface 31 along longitudinally extending lines, for example by bonding at 56 along recessed areas 32. This approach is particularly advantageous when the sheet-like member 33 is a flexible thin membrane or film which may be adhesively or chemically bonded to the recessed areas so as to define flow channels 34 over the convex or relatively elevated areas of the heat transfer panel. The use of bonding as retention means for the heat transfer panel eliminates the number of retention components required for formation of the present panel, as compared to the preferred form of my prior U.S. Pat. No. 4,205,658.

Bonding of membrane 33 to sheet 31 along concaved surfaces or corrugations 32 has an additional advantage. The pressure of the heat transfer fluid in flow channels 34 tends to lift the membrane 33 away from support surface 32. This lifting action further generates a tendency of the membrane to peel away from the support surface, but the bonding of membrane 33 to concaved support surfaces 32 reduces the peel stress on the bond between membrane 33 and recesses 32.

In order to further enhance the reduction in peel stress and to ensure a uniform height or depth of the flow channels, it is a further feature of the present invention that support surface 31 include longitudinally extending upwardly stepped shoulders 57 at the side margins of the convexed relatively elevated areas of the panel. Shoulders 57 are upwardly stepped, as best may be seen in FIG. 2, by a height substantially equal to the desired height of flow channels 34, and the stepped shoulders are immediately proximate the concaved or recessed areas to which the membrane 33 is bonded. Upward stepping of shoulders 57 causes a greater break or angle with the concave areas so that peel stress is further reduced on the bond between the membrane and support surface. Additionally, if the flexible membrane has a longitudinal length which will cause the membrane 33 to be concentric with surface 31 when fully distended, the fluid pressure inside flow channel 34 will cause the membrane to be distended to essentially a uniform height above the support surface over the full transverse width of the flow channel. Moreover, the loading on the thin membrane will be largely in tension, which the membrane is well adapted to withstand. Thus, shoulders 57 produce a flow channel of uniform height for even and efficient heat transfer across the channel by reason of the natural tendency of the even pressure of the fluid to cause flexible membrane 33 to assume a spherical sector shape, which will be concentric to the spherical convex sector shape of support surface 31.

Referring now to FIGS. 3 and 4, an alternative embodiment of the heat transfer panel of the present invention is illustrated. The panel, generally designated 60, includes a support surface 61 forming with longitudinally extending corrugations and a second sheet 62 positioned in superimposed relation thereover to define side-by-side flow channels 63 therewith. Molded and secured thereto are manifold means 64 having a substantial upwardly facing surface area 66 that engages the underneath side 67 of the support surface and substantially conforms and mates therewith.

In the form of the heat transfer panel of FIGS. 3 and 4, however, a third sheet-like member 67 is mounted to the same side of support member 61 as is the second sheet-like member 62. Third member 67 defines with second member 62 a second set of flow channels 68 above the first flow channels 63. Manifold means 64 is here additionally formed for the flow of a heat transfer fluid between the manifold means and the second set 68 of flow channels.

The heat transfer panel of FIGS. 3 and 4 preferably is formed by providing third sheet-like member 67 as a flexible membrane which is retained by retention means in close proximity to the support sheet so that the second set of flow channels 68 is also relatively thin and uniform in height for maximum heat transfer efficiency.

One manner of coupling manifold means 64 to the panel for communication of heat transfer fluid to flow channels 63 and 68 is to seal flexible membrane 62 to support surface 61 proximate the end 69 of membrane 62. As best may be seen in FIG. 3, end 69 and membrane 62 terminate short of the end 71 of support member 61. Accordingly, with the flexible membrane 62 sealed to surface 61 proximate end 69, manifold member 72 can be secured to the panel inwardly of panel end 71 and openings 73 used to communicate fluid to flow channels 63. The opposite end of the panel is similarly formed and manifold member 74 is positioned inwardly of end 76 of the panel so as to communicate fluid to flow channels 63. The upper flexible membrane 67, however, extends all the way to and is sealed proximate the end of 71 of the support sheet. Preferably it extends around ends 76 and 79 to minimize crack propagation and enhance tear resistance. A second tubular manifold 76 with openings 77 communicating with second set of flow channels 68 between the membranes 62 and 67. A corresponding manifold 78 is provided at the opposite of the panel.

The panel in FIGS. 3 and 4 is suitable for use as a heat exchanger as well as an energy absorption or radiation panel. The fluids used in the two sets of flow channels can be the same and simply cycled through the panel twice, or they can be two different fluids with entirely separate circulation systems.

The heat transfer panel of FIGS. 3 and 4 further is formed with mechanical coupling means for retaining membranes 62 and 67 against support surface 61. Instead of adhesive or thermal bonding, as is contemplated in the embodiment of FIGS. 1 and 2, the heat transfer panel of FIGS. 3 and 4 is formed with longitudinally extending keyway means 81, in the form of pockets or recesses in support member 61, and mounted in each of the longitudinally extending pockets is keeper means 82, which mate with the keyways and retain or lock the membranes to support surface 61.

The recessed portions of the corrugations in the panel of FIGS. 3 and 4 include longitudinally extending pockets into which membranes 62 and 67 extend and a rod or other form of keeper that can be slideably mounted in the pocket. Rod 82 is of a diameter so that it cannot be pulled up through the throat 83 of the pocket, defined by longitudinally extending shoulders 84. At the side flanges 86 of the panel, it is preferable that membranes 62 and 67 be bonded to the flanges. It will be noted that the shoulders 84 defining throat 83 for the mechanical coupling of the membranes to the support surface also act to define the height of the flow channels 63 and 68 in the same manner as shoulders 57 in the panel of FIGS. 1 and 2. While peel stress is not as significant in connection with the mechanical coupling of the membranes to the support member, the use of shoulders to cause the membranes to distend in a cylindrical sector concentric with the support surface is helpful in insuring substantially even flow channel height.

As will also be appreciated, a glazing member or sheet can be positioned above the panel of FIGS. 3 and 4, as is shown in FIG. 2. In such a configuration, the glazing spacer means can further be locked by the keeper or longitudinally extending rods 82 to the pockets, or alternatively, the glazing spacer means can be integrally formed with the keeper means 82 and extend out through throat 83 for support of the glazing sheet.

It is contemplated that other forms of mating keyway means 81 and keeper means 82 may be employed as mechanical retention means for securing sheet-like member 62 to support surface 61. Thus, if the sheet-like member 62 is a thin but somewhat rigid sheet which is molded or preformed with convex surfaces defining flow channels 63 and a longitudinally extending protrusion having an enlarged head portion, the protrusion would function as a keeper and could snap into keyway means 81. One or both of the protrusion and the keyway could be resilient to enable passage of the enlarged head of the protrusion into the pocket in the keyway. It is also contemplated that the keyway and keeper could be reversed, with a protrusion (keeper) on support surface 61 and a longitudinally extending keyway (pocket) on a mold sheet-like member 62.

Figure 5:
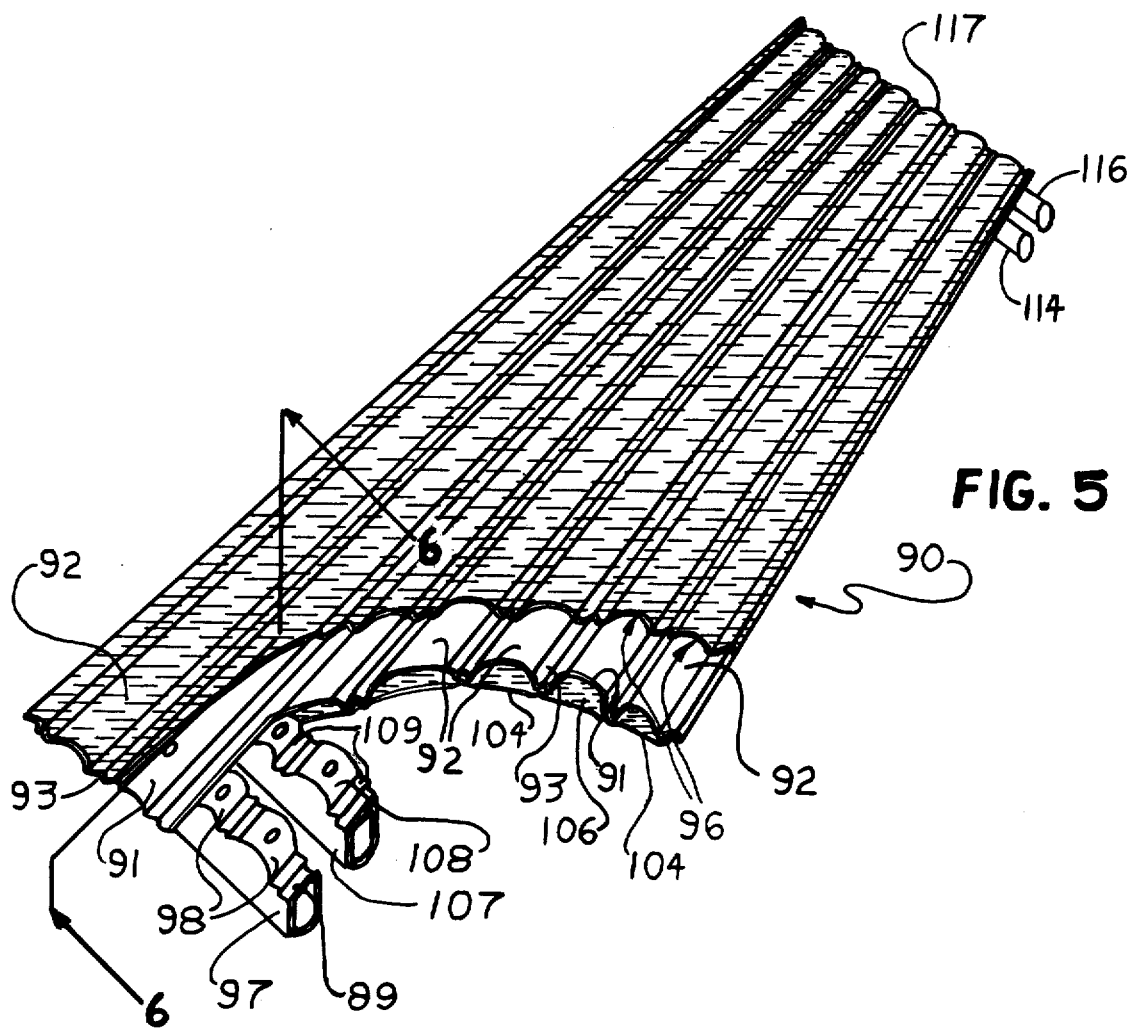
FIG. 5 is a top prospective view of a further alternative embodiment of the heat transfer panel of the present invention.
Figure 6:
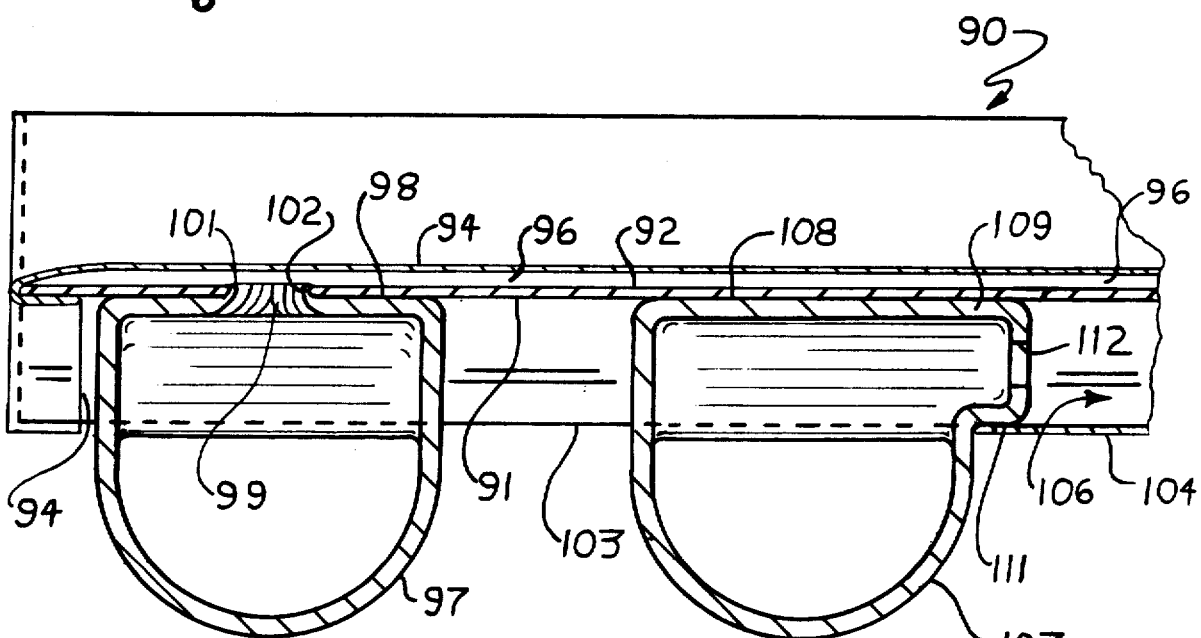
FIG. 6 is an enlarged, fragmentary, cross-sectional taken substantially along the plane of line 6—6 in FIG. 5.

Referring now to FIGS. 5 and 6, still a further alternative embodiment of the heat transfer panel of the present invention is shown. In this embodiment panel 90 includes a corrugated support surface 91 in which there are a plurality of side-by-side convexed surfaces 92, which make up the vast majority of the area of panel 90, and connecting recessed or grooved areas 93. Mounted over support surface 91 is a first flexible membrane 94 which is secured, for example, by bonding as above described, to the support member 91 so as to define flow channels 96 between the membrane and support member. Manifold means in the form of manifold member 97 is molded with substantial upwardly facing areas 98 and mating recessed areas 99 so as to conform to the underneath side of support member 92 and provide transverse rigidity to the panel. As described above in connection with FIG. 1, manifold means 97 includes an opening 99 defined by collar or dimple 101 which protrudes through opening 102 in support member 91 so as to enable communication of a heat transfer fluid to and from flow channels 96.

As thus far described, panel 90 is of similar construction to panel 30 of FIGS. 1 and 2. The transverse cross-section, however, of support member 91 is formed somewhat differently than is the case for the support member 31 of panel 30. In panel 90, support member 91 is formed with side-by-side grooves having a W-shaped cross-section which may have a height dimension which are somewhat greater than the concaved or recessed grooves 32 of panel 30. The W-shaped grooves 93 of panel 90 enable bonding of film or membrane 94 in the concave portions of the groove so as to minimize peel stress. Additionally, however, the W-shaped groove 93 affords a concave surface on the underneath side 103 of support member 91 to which a sheet-like third member 104 may be mounted to define with the corrugations of the sheet a second set of flow channels 106 on the underneath side of panel 90. The manifold means of panel 90 further includes a second manifold member 107, which extends transversely across the panel and is formed with upwardly facing surfaces 108 that engage and conform to the underneath side 103 of he panel, including grooves 93. Manifold member 107 is formed with laterally extending projections 109 that extend into the flow channels and provide a surface 111 against which membrane or sheet 104 can be bonded or sealed. Additionally, each of projections 109 is formed with an opening 112 for the communication of the heat transfer fluid between the manifold and flow channels 106.

As is the case for formation of manifold 97, manifold 107 can advantageously be blow molded. The blow molding can be directly against the underneath side of the sheet so that surface 108 conforms to the sheet, and additionally a mold can be used so that lateral projections 109 have outer surfaces that conform substantially to the interior configuration of flow channels 106. The conformance of projections 109 to the interior of the flow channel enables sealing of the panel to the manifold and further helps the overall structural rigidity of the panel.

The panel of FIGS. 5 and 6 provides a structure which is particularly well suited for the use of a liquid heat transfer fluid having a high heat coefficient, such as water, in flow channels 96 and a fluid having a lower heat coefficient, such as air, within larger flow channels 106. The panel is also provided with corresponding manifold members 114 and 116 at end 117 of the panel. Manifold member or header 116 will be formed substantially identically to manifold 97, while manifold 114 will be formed in a manner corresponding to manifold 107. Thus, the heat transfer panel of FIGS. 5 and 6 can be advantageously employed as a radiant energy absorbing solar panel and a counterflow heat exchanger for forced-air heating of a structure. It should be noted further that the third sheet member 104 adds to the overall structural rigidity of the panel. Moreover, even when the panel is not used as a heat exchanger, the flow channels 106 act as dead air chambers which provide insulation and enhance the overall performance of the panel as a solar heat collector.

A further important aspect of the manifold means of FIGS. 5 and 6 and particularly manifold member 107 is that the manifold is formed to provide an end closure for flow channels 106. Thus, unlike manifold 97 or manifolds in which a pipe or header is simply inserted into a bag or envelope, manifold means 107 forms a seal between support member 91 and membrane 104 across the open ends of flow channels 106. Moreover, member 104 is bonded, at surface 111 on manifold 107 and at the downwardly facing concave portion of groove 93 to support member 91, to both the manifold and the support member. It is, therefore, a composite bonding of membrane 104 to the concave longitudinally extending groove 93 and to lateral projection surface 111 that closes the flow channels.

In FIGS. 7 through 10, a heat transfer panel, generally designated 120, is shown which also includes manifold means 121 which is formed to act as an end closure for the open ends 122 of flow channels in the panel. As is the case in previously described panels, panel 120 includes a first sheet-like member 123 formed with longitudinally extending corrugations to which a second member, preferably a membrane 124, is superimposed and secured. A third sheet-like member, membrane 126, is secured to support sheet 123 on the side thereof opposite to membrane 124. Panel 120, therefore, has flow channels on both sides of support sheet 123 in a manner similar to panel 90 of FIGS. 5 and 6.

The manifold means of panel 120, however, provides transverse rigidity to the panel by being formed with a plurality of lateral projections which extend into the open ends 122 of the flow channels and engage, mate with, and conform to the interior of the flow channels. In the form of the invention of panel 120 there are a pair of manifold members, namely, an upper member 127 and a lower member 128 which extend transversely across one end of the panel. A correspondingly formed pair of manifolds 129 and 131 are provided at the opposite end of panel 120.

As best may be seen in FIGS. 8, 9 and 10, upper manifold member 127 is formed with a plurality of laterally extending projections 132 which extend outwardly and are stepped downwardly at 133 for insertion into the open end 122 of flow channels 134 on the upwardly facing side of panel 120. Additionally, along surfaces 136, 137 and 138 projections 132 engage and mate with corrugated support member 123. The upwardly facing surface 139 of projections 132 engages and forms a surface on which membrane 124 can be sealed or bonded. Opening from manifold 127 to passageways 134 is a metering orifice or opening 141.

The lower manifold 128 is formed in a manner similar to manifold 127, but instead it is upwardly stepped at 142 for insertion into the open ends 122 of passageways 143 on the downwardly facing side of panel 120. Thus, manifold 128 includes a plurality of lateral projections 134, which are inverted with respect to projections 132, but similarly have surfaces 146, 147 and 148 which are formed to conform to and mate with support member 123 and a downwardly facing surface 149 on which membrane 126 is bonded and supported.

When heat transfer panel 120 is used as a counterflow heat exchanger, a heat transfer fluid from manifold 127 will be flowing out through orifices 141 in the direction of arrows 151, while fluid on the underneath side of the panel will be flowing in the opposite direction out through directions 144 in the direction of arrows 152.

In the form of the panel shown in FIGS. 7 through 10, upper membrane or sheet 124 is sealed to a combination of surfaces 139 on the projections from manifold member 127 and concaved surfaces 153 of support member 123. The lower membrane or sheet 126 is bonded or sealed to downwardly facing surfaces 149 on the lateral projections from manifold member 128 and the concave surfaces 154 on corrugated support member 123 (best seen in FIG. 9).

In FIG. 11 a heat transfer panel 160 includes manifold means 161 molded to the bottom surface of corrugated support sheet or member 162. Distended across the corrugations is a second sheet or membrane 163, and the panel is formed with a glazing sheet 164 superimposed over sheet 163 to form flow channels 166. Panel 160 is formed with the primary or the majority of the surface area of the panel being provided by concaved upwardly facing surfaces so that the flow channels 166 are greater in depth and better suited for a heat transfer fluid such as air.

It is a further important feature of the present invention to form the panel so that is may be readily coupled in side-by-side relation to other panels without the need for specialized plumbing or difficult and time-consuming manipulation of the panels. Thus, the panels of the present invention are formed so that they may be placed down right next to an adjacent panel and then coupled together.

In FIG. 11, panel 160 is shown mounted in side-by-side relation to panel 160a. Each of the panels is formed with longitudinally extending side edges 167 and 167a which enable placement next a similarly formed panel in edge-to-edge abutting relation, in this case on longitudinally extending side mount member 168. Manifold means 161 and 161a are tubular members which extend transversely across the panels and terminate in oppositely facing nipple portions 169 and 171. Mounted slideably on one of nipple portions 169 and 171 is coupling means 172. As shown in FIG. 11, coupling means 172 is mounted on nipple portion 169 and may be slid to the position shown in phantom so that it spans across the abutting ends 173 of the nipple portions. Once moved to the positions shown in phantom, the coupling means can be secured in place so as to couple the two panels together for continuous flow of a heat transfer fluid from one manifold to the laterally adjacent manifold. Coupling means 172 can advantageously be formed as a band-type sleeve coupling used in conventional plumbing applications and formed with a band that can be tightened down around a resilient sealing pad.

In the preferred form of the manifold construction, one end of the manifold is formed with a first nipple portion which is relatively long while an opposite end of the manifold is formed with a nipple portion which is relatively short. Thus, if first nipple portion 169 is formed to have a length about equal to coupling sleeve 172, the sleeve can be mounted on the nipple portion 169. Nipple portion 171 preferably has a length equal to about one half the length of sleeve 172 so that it will enable sliding of the sleeve onto nipple portion 171 to a distance about equal to one half the sleeve length. As will be understood, the nipple portion on the end of panel 160 has a length about equal to nipple portion 171, while the nipple portion on the opposite end of manifold 161a has a length about equal to nipple portion 169 and has a coupling sleeve 172 mounted thereto.

FIGS. 12 and 13 show further alternative embodiments of manifolds suitable for use with the panel of the present invention. In FIG. 12, manifold 181 is formed with a stepped surface 182 which conforms to the underneath side of corrugated support member 183. Upper membrance 184 is bonded or sealed to an upwardly facing surface 186 on the manifold, and opening 187 meters the flow of heat transfer fluid into flow channel 188.

In FIG. 13 the corrugated support member 191 is formed with an end 192 that mates with surface 193 of manifold 194. The second sheet or membrane 196 extends around and is bonded to the back side of manifold 194 and defines a flow channel 197 into which heat transfer fluid flows through opening 198 in the manifold.

In both FIGS. 12 and 13, manifold means mates with the corrugated sheet to provide the transverse rigidity desired and the manifold acts as an end closure for the flow channels.

Referring now to FIGS. 14 and 15, a glazed panel, generally designated 200, is shown, which is formed to provide enhanced safety, particularly when the panel is used for home water heating. Panel 200 includes a plurality of side-by-side flow channels that are formed between a corrugated sheet and superimposed sheet or membrane, as described hereinabove. In addition, the panel includes a glazing sheet 201 which is in superimposed spaced relation over the tops of the flow channels 202. In order to provide a heat transfer panel which will not produce stagnation and super heating of the water in the panel, the panel 200 is further formed with vent means, generally designated 203 which is mounted to the panel formed for venting of the dead air space 204 between the flow channels 202 and glazing sheet 201.

Vent means 203 is constructed to enable movement between an open condition venting dead air space 204, when temperature reaches a predetermined value, and a closed position enabling a build-up of heat in dead air space 204, when the temperature in the dead air space falls below a predetermined value. Venting of the transfer panels is broadly known, but in the improved panel of the present invention vent means 203 is formed as first openings 206 in the panel proximate a first end 207 and communicating with dead air space 204. Additionally, vent means 203 includes second openings 208 proximate second end 209 of the panel which also communicate with the dead air space 204. Moveably mounted proximate at least one of openings 206 and 208 is a vent member 211. Vent member 211 can be moved between a position across openings 208 which will block the flow through the openings 208 to a position exposing openings 208 for the flow of air to and from dead air space 204. As shown in FIG. 15, the vent member is shown in solid lines across the openings 208 and in phantom lines is shown in a position in which openings 212 in vent member 211 would be aligned with openings 208 so as to permit the flow of air through openings 208.

Panel 200 is designed for use with one end of the panel in an elevated condition. Accordingly, upon alignment of openings 212 with openings 208, a chimney effect will be produced in the panel. The hot air in dead air space 204 will try to rise out of the dead air space through the openings 212 and 208, and cooler air will be pulled in through the openings 206 in the lower end of the panel.

The movement of vent member 211 between the opened and closed conditions permitting or preventing venting of the dead air space is accomplished in the panel of the present invention by providing a biasing means coupled to bias the vent member for movement between the open and closed positions. In the preferred form, biasing means includes a first spring member 213 and a second spring member 214, each coupled to vent member 211 and formed to bias the vent member for movement in opposite directions. First spring 213 and second spring 214 are formed of materials in which at least one of the spring constants will change with temperature to produce a spring force in the first spring member which exceeds the spring force in the second spring member below the predetermined temperature at which venting is desirable. Additionally, the materials for the spring should be selected to produce a spring force in the second spring member which exceeds the spring force in the first spring member above the predetermined temperature level. Such a change in the spring constants can be achieved by forming these springs of a spring steel on one side and a spring made of beta brass or nitinal (nickel-titaneum alloy) both of which have "hot memories." Betabrass and nitinal will snap into a particular shape when heated above their threshold temperature, which is preferably set to be about 150° F. Thus, if spring 213 is formed of a spring steel and spring 214 is formed of nitinal, the spring steel will have a spring constant which is greater and a spring force on vent member 211 maintaining the vent in the closed position against stop member 216 until 150° F. is reached. Upon reaching that temperature the nitinal spring 214 will experience a substantial increase in the spring constant which will cause the vent member 211 to be pulled to a position against stop 217, opening the dead air space and cooling the panel which would otherwise have become stagnated and would have produced dangerously overheated water.

In the preferred form, panel 200 is provided with vent means at the upper end of the panel and with a structure at the lower end of the panel which enables entry of the air under the chimney effect without the entry of water into the panel and yet impedes the flow of air when the vent is closed at one end of the panel. This impeding effect is accomlished by providing panel 200 with a chamber 221 having a bottom surface 222 through which openings 223 are formed. Distended across openings 223 is a flow impeding means 224, in this case a screen. Thus, air must pass beyond screen 224 through openings 223 into chamber 221. The air is then pulled through openings 206 into the dead air space under the chimney effect. When the vent is closed, the screen and chamber impede the flow of air into dead air space 224 and thereby enable the temperature in the dead air space to increase for increasing energy absorption by the panel.

A further important feature of the heat transfer panel of the present invention is to form the panel as a selective absorber in which radiation having wave lengths in the range between about 0.3 and about 2 microns are absorbed and radiation having wave lengths in the range of between about 3 and about 30 microns are reflected. Selective absorbers have been employed before in connection with heat transfer panels, but such a selective absorption has been accomplished by depositing an energy absorbing material onto the surface of a sheet of metal which is generally reflective to infrared. Semiconductor materials such as lead sulphite, silicone, germanium and mixed oxides of copper and sulfides of nickel and zinc have been coated on reflective sheets by techniques such as electroplating, vapor deposit, thermal oxidation and chemical conversions. In addition to the difficulty and expense of producing sheets having thin but consistent semiconductor deposits on them so that they can act as selective absorbers, the resultant absorber coating is vulnerable to degradation and causes high reflective losses due to the high index of refraction of such a coating.

In the present invention, the selective absorber is formed by an upper member, preferably a membrane which is formed from a substantially clear or radiation transparent base material, such as a fluorinated ethylene-propylene, into which base material an energy absorbing material, such as a semiconductor, is substantially uniformly dispersed. The energy absorbing material dispersed in the transparent base should be transparent to radiation having wave lengths between above 3 and about 30 microns and should be substantially absorbant to radiation having wave lengths between about 0.3 to 2 microns (the solar spectrum). The semiconductor materials above set forth will meet these criteria.

Additionally, the selective absorber in the panel of the present invention should include a surface which is positioned farther from the source of radiation than the selective filter, which surface is substantially reflective to radiation having wave lengths in the range of at least 3 to about 30 microns. Thus, the heat transfer panel can be formed with a selective filter as the flexible membrane and the reflective surface as the corrugated support member. Provision of the membrane in which the energy absorbing material is dispersed throughout a degradation resistant plastic membrane, rather than coated on the surface of a metal, quickly increases the durability of the selective absorber and reduces the reflective losses that occur when a coating is used.

In the preferred form of the heat transfer panel including a selective absorber, the base material is fluorinated ethylene-propylene and the energy absorbing material has a particle size of about 1.5 microns. If the absorbing material is included in the base material in relatively small quantities (to effect approximately 90% single pass absorption of the incident radiation), the support surface, which may be a reflective metallic surface such as aluminum-coated surface, will produce a panel in which the selective filter defines one side of the flow channel while the reflector defines the other.

The air-flow panel of FIG. 11 is particularly well suited for use of a selective absorber film. In FIG. 11 glazing 164 would be an infrared transparent glazing, such as FEP film, and membrane 163 would be formed as a selective absorber with an energy absorbing material dispersed throughout the membrane. The support surface 162 defining the bottom of channels 166 can be reflective, for example, a shiny metallic surface (aluminum or a plastic with a metallic coating). The resultant panel will be highly absorbant to the incoming radiation, with a vastly reduced radiation heat loss.

Referring now to FIG. 16, a plurality of heat transfer panels 231 are shown mounted together on a frame, generally designated 232, to provide a roof structure. Frame 232 can be seen to be relatively simple in nature due to the self-supporting construction of panels 231. Thus, frame 231 includes rafters 233 to which longitudinally extending stringers 234 are mounted. Connecting stringers 234 are panel side mount members 236, over which the side edges 237 of adjacent panels 231 are mounted (see also member 168 in FIG. 11).

Each of panels 231 is preferably similarly formed with inlet manifolds 238 and outlet manifolds 239 formed for coupling to adjacent panels in a manner as was more fully described in connection with FIG. 11. Additionally, each panel preferably is formed so that inlet manifolds 238 are secured to the panels at spaced distance D from the lower ends 243 of the panel, while the manifold at the upper end 241 of the panel is secured immediately proximate upper ends 241. As can be seen in the center of FIG. 16, this permits shingling of the panels, that is overlapping of lower end 243 of the upper panel over upper end 241 of the lower panel, without having the manifolds interfere with the overlapping.

Shingling of the panels obviously facilitates formation of a water-tight roof and when the panels are further formed with raised flanges or edges 237, it is further desirable to enable nesting of the lower ends 243 inside the side flanges 237 of the upper end of the panels. This can be accomplished by tapering the panels so that they narrow slightly from top to the narrower bottom. Such tapering need only be about $\frac{1}{4}$ inch over the length of the panel, and can be readily accomplished during formation of the panel by a jig or fixture which holds the panel support sheet in a slightly tapered condition until the manifolds are blow molded against the panel corrugations and lock or hold the panel in a tapered condition.

What is claimed is:

1. A durable low-cost heat transfer panel including a sheet-like flow channel defining means formed with longitudianlly extending corrugations defining at least in part a plurality of side-by-side longitudinally extending flow channels, and manifold means secured to said flow channel means proximate an end thereof and formed for the flow of a heat transfer fluid between said manifold means and said flow channels, wherein the improvement in said heat transfer panel is comprised of:

said manifold means being provided with a manifold surface formed to extend transversely across one of an upwardly facing and a downwardly facing side of said channel defining means, said manifold surface having an area substantially conforming to and mating with a substantial area of said corrugations on said one of said upwardly and said downwardly facing side of said flow channel defining means proximate said end, and said manifold means being secured to said flow channel defining means with said manifold surface sealed in interengagement with said area of said corrugations.

2. A heat transfer panel as defined in claim 1 wherein, said flow channel defining means is provided by a longitudinally rigid corrugated sheet-like support member, and a relatively flexible member extending over said support member, and said manifold means is secured and sealed to said support member to provide transverse rigidity to said panel.

3. The heat transfer panel as defined in claim 2 wherein, said manifold means is tubular, said manifold means and said support member are formed with aligned openings passing through a side of said support member and passing through said manifold surface in said manifold means to permit fluid flow between said manifold means and said flow channels.

4. A heat transfer panel as defined in claim 3 wherein, said openings in said manifold surface of said manifold means are defined by tubular protrusions, said openings in said side of said support member are dimensioned for receipt of said protrusions, and said protrusions have a height extending through said openings in said side of said support member, and said protrusions are bonded to the portion of said support member defining said openings in said side.

5. The heat transfer panel as defined in claim 2 wherein, said manifold means has a tubular body and said manifold surface is provided by a plurality of lateral projections from said tubular body, said projections conforming to said one of said upwardly facing and said downwardly facing side of said support member.

6. The heat transfer panel as defined in claim 5 wherein, said lateral projections are formed with openings therein for the communication of fluid between said manifold means and said flow channels, and said lateral projections substantially conform to the interior configuration of said flow channels and are mounted to extend into said flow channels, and said openings are axially aligned with said flow channels.

7. The heat transfer panel as defined in claim 1 wherein, said flow channel defining means is provided by a longitudinally rigid corrugated support member and a sheet-like member mounted to each side of said support member to define a set of flow channels on each side of said support member; and said manifold means is formed as a pair of manifolds each having a plurality of laterally extending projections therefrom dimensioned to extend inside ends of said flow channels and formed with said manifold surface, one of said pair of manifolds being mounted with said projections extending into said flow channels on one side of said support member and a second of said pair of manifolds mounted with said projections extending into said flow channels on the opposite side of said support member, said projections on both of said pair of manifolds having openings therein for communication of a heat transfer fluid between said manifold and said flow channels.

8. The heat transfer panel as defined in claim 2 wherein, said relatively flexible member is provided as a flexible membrane which substantially conforms to the surface corrugations of an upwardly facing side of said support member, said membrane being bonded to said support member proximate the end of said support member to which said manifold means is secured and said membrane being bonded to said support surface along the recessed areas of said corrugations to define said flow channels on the elevated areas of said corrugations said manifold means is secured to and extends across a downwardly facing side of said support member, said support member is formed with a set of openings therethrough inwardly of the end to which said membrane is bonded, and said manifold is formed with a set of openings in registration with said openings in said support member for communicating of fluid between said manifold and said flow channels through said support member.

9. A heat transfer panel including a sheet-like first member flow channel defining means formed with longitudinally extending partition means defining a plurality of side-by-side longitudinally extending flow channels, and manifold means secured to said flow channel defining means proximate an end of said panel and formed for the flow of a heat transfer fluid between said manifold means and said flow channels, said flow channels terminating in a plurality of side-by-side open ends, and said manifold means extending transversely across said panel and mounted in sealed relation to said flow channel defining means and formed to provide an end closure for said flow channels at said open ends wherein the improvement in said heat transfer panel is comprised of:

said flow channel defining means is provided by a relatively rigid sheet and a flexible membrane, said manifold means is formed to substantially conform to an end portion of said rigid sheet and is sealed thereto, and said flexible membrane extends along a portion of the outside of said manifold means and is sealed thereto.

* * * * *

UNITED STATES PATENT AND TRADEMARK OFFICE
CERTIFICATE OF CORRECTION

PATENT NO. : 4,473,066
DATED : September 25, 1984
INVENTOR(S) : Peter C. Clark

It is certified that error appears in the above-identified patent and that said Letters Patent are hereby corrected as shown below:

Col. 6, line 51, delete "opqque" and insert ---opaque---;

Col. 12, line 29, delete "134" and insert ---144---; and

Col. 12, line 39, delete "directions 144" and insert

---orifices 145---.

Signed and Sealed this

Seventh Day of May 1985

[SEAL]

Attest:

DONALD J. QUIGG

Attesting Officer

Acting Commissioner of Patents and Trademarks